US012682703B2

(12) United States Patent
Flick

(10) Patent No.: US 12,682,703 B2
(45) Date of Patent: Jul. 14, 2026

(54) ENHANCED VEHICLE HISTORY REPORTING SYSTEM

(71) Applicant: State Farm Mutual Automobile Insurance Company, Bloomington, IL (US)

(72) Inventor: Bryan Flick, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 85 days.

(21) Appl. No.: 18/741,586

(22) Filed: Jun. 12, 2024

(65) Prior Publication Data

US 2025/0336247 A1     Oct. 30, 2025

Related U.S. Application Data

(60) Provisional application No. 63/640,772, filed on Apr. 30, 2024.

(51) Int. Cl.
| | |
|---|---|
| *G07C 5/08* | (2006.01) |
| *B60K 35/85* | (2024.01) |
| *B60W 40/09* | (2012.01) |
| *B60W 40/105* | (2012.01) |
| *G07C 5/00* | (2006.01) |
| *H04W 4/02* | (2018.01) |

(52) U.S. Cl.
CPC .............. *G07C 5/085* (2013.01); *B60K 35/85* (2024.01); *B60W 40/09* (2013.01); *B60W 40/105* (2013.01); *G07C 5/006* (2013.01); *H04W 4/02* (2013.01)

(58) Field of Classification Search
None
See application file for complete search history.

(56) References Cited

U.S. PATENT DOCUMENTS

| | | |
|---|---|---|
| 3,702,989 A | 11/1972 | Provenzano et al. |
| 3,866,166 A | 2/1975 | Kerscher et al. |
| | (Continued) | |

OTHER PUBLICATIONS

"Smarter Car Purchases Made Possible with Instant VIN Reports' Enhanced Vehicle History Report, a Carfax Alternative", Webpage Article, Apr. 17, 2023, https://www.wbtw.com/business/press-releases/ein-presswire/628391029/smarter-car-purchases-made-possible-with-instant-vin-reports-enhanced-vehicle-history-report-a-carfax-alternative/.

(Continued)

*Primary Examiner* — Abdhesh K Jha
(74) *Attorney, Agent, or Firm* — Foley & Lardner LLP

(57) ABSTRACT

A vehicle reporting system for generating vehicle indicators may (1) receive vehicle usage information associated with a vehicle; (2) a first vehicle indicator for the vehicle based upon the vehicle usage information, the first vehicle indicator including a first quantitative indication regarding how the vehicle was driven during a first period of time with respect to a first driving characteristic; (3) generate a second vehicle indicator for the vehicle based upon the vehicle usage information, the second vehicle indicator including a second quantitative indication regarding how the vehicle was driven during a second period of time with respect to a second driving characteristic, the second driving characteristic being different than the first driving characteristic; and/or (4) perform an action using the first vehicle indicator and the second vehicle indicator.

16 Claims, 7 Drawing Sheets

(56) References Cited

U.S. PATENT DOCUMENTS

| | | | |
|---|---|---|---|
| 4,027,289 | A | 5/1977 | Toman |
| 4,159,531 | A | 6/1979 | McGrath |
| 4,258,421 | A | 3/1981 | Juhasz |
| 4,843,575 | A | 6/1989 | Crane |
| 5,361,201 | A | 11/1994 | Jost et al. |
| 5,797,134 | A | 8/1998 | McMillan et al. |
| 5,941,915 | A | 8/1999 | Federle et al. |
| 6,173,310 | B1 | 1/2001 | Yost et al. |
| 6,289,332 | B2 | 9/2001 | Menig et al. |
| 6,434,512 | B1 | 8/2002 | Discenzo |
| 6,502,080 | B1 | 12/2002 | Eichorst et al. |
| 6,526,335 | B1 | 2/2003 | Treyz et al. |
| 6,654,770 | B2 | 11/2003 | Kaufman |
| 6,711,495 | B1 | 3/2004 | Ukai et al. |
| 7,111,005 | B1 | 9/2006 | Wessman |
| 7,174,243 | B1 | 2/2007 | Lightner et al. |
| 7,338,443 | B1 | 3/2008 | Tucker |
| 7,676,306 | B2 | 3/2010 | Kubo et al. |
| 7,711,574 | B1 | 5/2010 | Bradley et al. |
| 7,765,039 | B1 | 7/2010 | Hagenbuch |
| 8,014,974 | B2 | 9/2011 | Doddek et al. |
| 8,140,358 | B1 | 3/2012 | Ling et al. |
| 8,838,324 | B2 | 9/2014 | Suzuki et al. |
| 9,053,589 | B1 | 6/2015 | Kator et al. |
| 9,129,460 | B2 * | 9/2015 | McClellan ............. G07C 5/085 |
| 10,056,008 | B1 * | 8/2018 | Sweany ............... G09B 19/167 |
| 10,423,989 | B2 * | 9/2019 | Binion ............... G06Q 30/0278 |
| 11,334,926 | B1 | 5/2022 | Binion et al. |
| 2002/0065698 | A1 | 5/2002 | Schick et al. |
| 2002/0143646 | A1 | 10/2002 | Boyden et al. |
| 2002/0144233 | A1 | 10/2002 | Chong et al. |
| 2003/0009270 | A1 | 1/2003 | Breed |
| 2003/0033175 | A1 | 2/2003 | Ogura et al. |
| 2003/0120472 | A1 | 6/2003 | Lind |
| 2004/0019517 | A1 | 1/2004 | Sennott |
| 2004/0024483 | A1 | 2/2004 | Holcombe |
| 2004/0153356 | A1 | 8/2004 | Lockwood et al. |
| 2004/0268248 | A1 | 12/2004 | Makela |
| 2005/0154657 | A1 | 7/2005 | Kim et al. |
| 2006/0033625 | A1 | 2/2006 | Johnson et al. |
| 2006/0053075 | A1 | 3/2006 | Roth et al. |
| 2006/0114531 | A1 | 6/2006 | Webb et al. |
| 2006/0167593 | A1 | 7/2006 | Eckles |
| 2006/0229777 | A1 | 10/2006 | Hudson et al. |
| 2006/0253293 | A1 | 11/2006 | Osborn |
| 2007/0043878 | A1 | 2/2007 | Carlson et al. |
| 2007/0136077 | A1 | 6/2007 | Hammond et al. |
| 2007/0179692 | A1 | 8/2007 | Smith et al. |
| 2008/0046383 | A1 | 2/2008 | Hirtenstein et al. |
| 2008/0316006 | A1 | 12/2008 | Bauman et al. |
| 2009/0177352 | A1 | 7/2009 | Grau et al. |
| 2009/0327977 | A1 | 12/2009 | Bachfischer et al. |
| 2010/0005010 | A1 | 1/2010 | Chenn |
| 2010/0106534 | A1 | 4/2010 | Robinson et al. |
| 2010/0274571 | A1 | 10/2010 | Mcfall et al. |
| 2010/0318451 | A1 | 12/2010 | Niccolini et al. |
| 2011/0012720 | A1 | 1/2011 | Hirschfeld |
| 2011/0046842 | A1 | 2/2011 | Smith |
| 2011/0251734 | A1 | 10/2011 | Schepp et al. |
| 2011/0264278 | A1 | 10/2011 | Gilbert et al. |
| 2012/0197699 | A1 | 8/2012 | Snell et al. |
| 2012/0209634 | A1 | 8/2012 | Ling et al. |
| 2012/0246036 | A1 | 9/2012 | Marr et al. |
| 2012/0262283 | A1 | 10/2012 | Biondo et al. |
| 2013/0304278 | A1 | 11/2013 | Chen |
| 2014/0052501 | A1 | 2/2014 | Dickson et al. |
| 2014/0058618 | A1 | 2/2014 | Rude et al. |
| 2014/0095047 | A1 | 4/2014 | Naylor |
| 2014/0102104 | A1 | 4/2014 | Read |
| 2014/0289078 | A1 | 9/2014 | Paul |
| 2014/0310186 | A1 | 10/2014 | Ricci |
| 2014/0322676 | A1 | 10/2014 | Raman |
| 2018/0357721 | A1 * | 12/2018 | Gation ................... G07C 5/085 |
| 2021/0097314 | A1 * | 4/2021 | Scanlon ............... G06V 20/584 |

OTHER PUBLICATIONS

"Which Vehicle History Report Is the Most Accurate?", Webpage Article, believed first published Apr. 2019, https://www.carouseliowacity.com/which-vehicle-history-report-is-the-most-accurate.

CarFax Sample Report, www.CarFax.com, accessed at http://www.carfax.com/phoenix/vehicle_history/SampleReport.cfx?reportName=consumerMobileWeb, archived Nov. 2012, accessed Jul. 2014.

Carfax Vehicle History Reports, [site visited Jun. 11, 2024], https://www.carfax.com/vehicle-history-reports/.

Evaluate driver-related risk in real time—Driver Risk Management for Employers, Webpage Article, Apr. 2022, https://www.verisk.com/495dad/siteassets/media/downloads/trasnportation-employment-screening/evaluate-driver-related-risk-in-real-time.pdf.

Experian Vehicle History Data, [site visited Jun. 11, 2024], https://www.experian.com/automotive/autocheck-business.

LexisNexis Vehicle History, [site visited Jun. 11, 2024], https://risk.lexisnexis.com/products/lexisnexis-vehicle-history.

Vehicle History Report, [site visited Jun. 11, 2024], https://www.kbb.com/camp/vehicle-history-report/.

Vehicle History Report, [site visited Jun. 11, 2024], https://www.vehiclehistoryreport.com/.

VIN Number Check, [site visited Jun. 11, 2024], https://www.vehiclehistory.com/vin-check.

VINData—Buy & Sell With Confidence, [site visited Jun. 11, 2024], https://www.vindata.com/.

What is NMVTIS?, National Motor Vehicle Title Information System, [site visited Jun. 11, 2024], https://vehiclehistory.bja.ojp.gov/.

* cited by examiner

400

406

408

ENHANCED VEHICLE HISTORY REPORTING SYSTEM

CROSS-REFERENCE TO RELATED APPLICATIONS

This application claims priority to and the benefit of U.S. Provisional Patent Application Ser. No. 63/640,772, filed Apr. 30, 2024, which is incorporated herein by reference in its entirety.

FIELD OF THE INVENTION

The present disclosure generally relates to vehicle reporting systems. More particularly, the present systems and methods relate to using vehicle usage information from a variety of sources to generate enhanced vehicle reporting, vehicle indicators, and vehicle recommendations.

BACKGROUND

Individuals may obtain information pertaining to used vehicles in a variety of ways. For example, an individual may obtain a vehicle history report from various national reporting agencies. Traditional reporting agencies may include information about various vehicles gathered from maintenance providers (e.g., maintenance actions reported for a particular vehicle) and government agencies (e.g., vehicle registration information, accident reports).

However, conventional vehicle information gathering and reporting techniques may be limited in the amount and type of data they provide about the actual usage and wear on a vehicle. Conventional techniques may also have certain other ineffectiveness, inefficiencies, encumbrances, and/or other drawbacks.

BRIEF SUMMARY

An enhanced vehicle reporting computer system may be provided that receives vehicle usage data and generates various vehicle indicators, vehicle recommendations, and/or vehicle reports for use by vehicle owners, prospective vehicle sellers, and/or prospective vehicle buyers. For instance, a user interface may be presented to a user, such as on a mobile device or other computing device, displaying the vehicle indicators, vehicle recommendations, and/or vehicle reports and allowing for the users to navigate through an application to obtain a variety of historical and real-time or near real-time information pertaining to one or more vehicles.

In one aspect, a vehicle reporting computer system for generating vehicle indicators may be provided. The computing system may include one or more local or remote processors, servers, sensors, memory units, transceivers, mobile devices, wearables, smart watches, smart glasses or contacts, augmented reality glasses, virtual reality headsets, mixed or extended reality headsets, voice bots, chat bots, ChatGPT bots, and/or other electronic or electrical components, which may be in wired or wireless communication with one another and/or operate as input and/or output devices. For instance, the computing system may include at least one or more memory devices having instructions stored thereon that, when executed by one or more processors, cause the one or more processors to perform several operations, including (1) receiving vehicle usage information associated with a vehicle; (2) generating a first vehicle indicator for the vehicle based upon the vehicle usage information, the first vehicle indicator including a first quantitative indication regarding how the vehicle was driven during a first period of time with respect to a first driving characteristic; (3) generating a second vehicle indicator for the vehicle based upon the vehicle usage information, the second vehicle indicator including a second quantitative indication regarding how the vehicle was driven during a second period of time with respect to a second driving characteristic, the second driving characteristic being different than the first driving characteristic; and/or (4) performing an action using the first vehicle indicator and the second vehicle indicator. The computer system may include additional, less, or alternate functionality, including that discussed elsewhere herein.

In another aspect, a computer-implemented method for providing a vehicle report may be provided. The computer-implemented method may be implemented via one or more local or remote processors, servers, sensors, memory units, transceivers, mobile devices, wearables, smart watches, smart glasses or contacts, augmented reality glasses, virtual reality headsets, mixed or extended reality headsets, voice bots, chat bots, ChatGPT bots, and/or other electronic or electrical components, which may be in wired or wireless communication with one another and/or operate as input and/or output devices. For instance, the computer-implemented method may include (1) receiving, using one or more processors and one or more computer-readable storage media having instructions stored thereon executable by the one or more processors, vehicle telematics information associated with a vehicle, the vehicle telematics information captured while the vehicle was driven via at least one of a sensor of the vehicle or a driving monitoring sensor installed within the vehicle; (2) generating, using the one or more processors, a plurality of vehicle indicators for the vehicle based upon the vehicle telematics information, each of the plurality of vehicle indicators providing information regarding how the vehicle was driven during a period of time with respect to a different driving characteristic; and/or (3) performing, using the one or more processors, an action using the plurality of vehicle indicators. The method may include additional, less, or alternate functionality, including that discussed elsewhere.

In another aspect, a non-transitory computer-readable medium comprising instructions stored thereon that, when executed by one or more processors, cause the one or more processors to perform various functionality and operations. For instance, the functionality and operations may include (1) receiving vehicle usage information associated with a vehicle; (2) generating a vehicle indicator for the vehicle based upon the vehicle usage information, the vehicle indicator including an indication regarding how the vehicle was driven during a period of time with respect to a driving characteristic; (3) generating a vehicle recommendation based upon the vehicle usage information, the vehicle recommendation including at least one of a recommended driving habit change or a recommended maintenance action; (4) generating a user interface including the vehicle indicator and the vehicle recommendation; and/or (5) causing the user interface to be displayed on a computing device of a user.

Advantages will become more apparent to those skilled in the art from the following description of the preferred embodiments which have been shown and described by way of illustration. As will be realized, the present embodiments may be capable of other and different embodiments, and their details are capable of modification in various respects.

Accordingly, the drawings and description are to be regarded as illustrative in nature and not as restrictive.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers indicate identical, functionally similar, and/or structurally similar elements.

Figure 1:
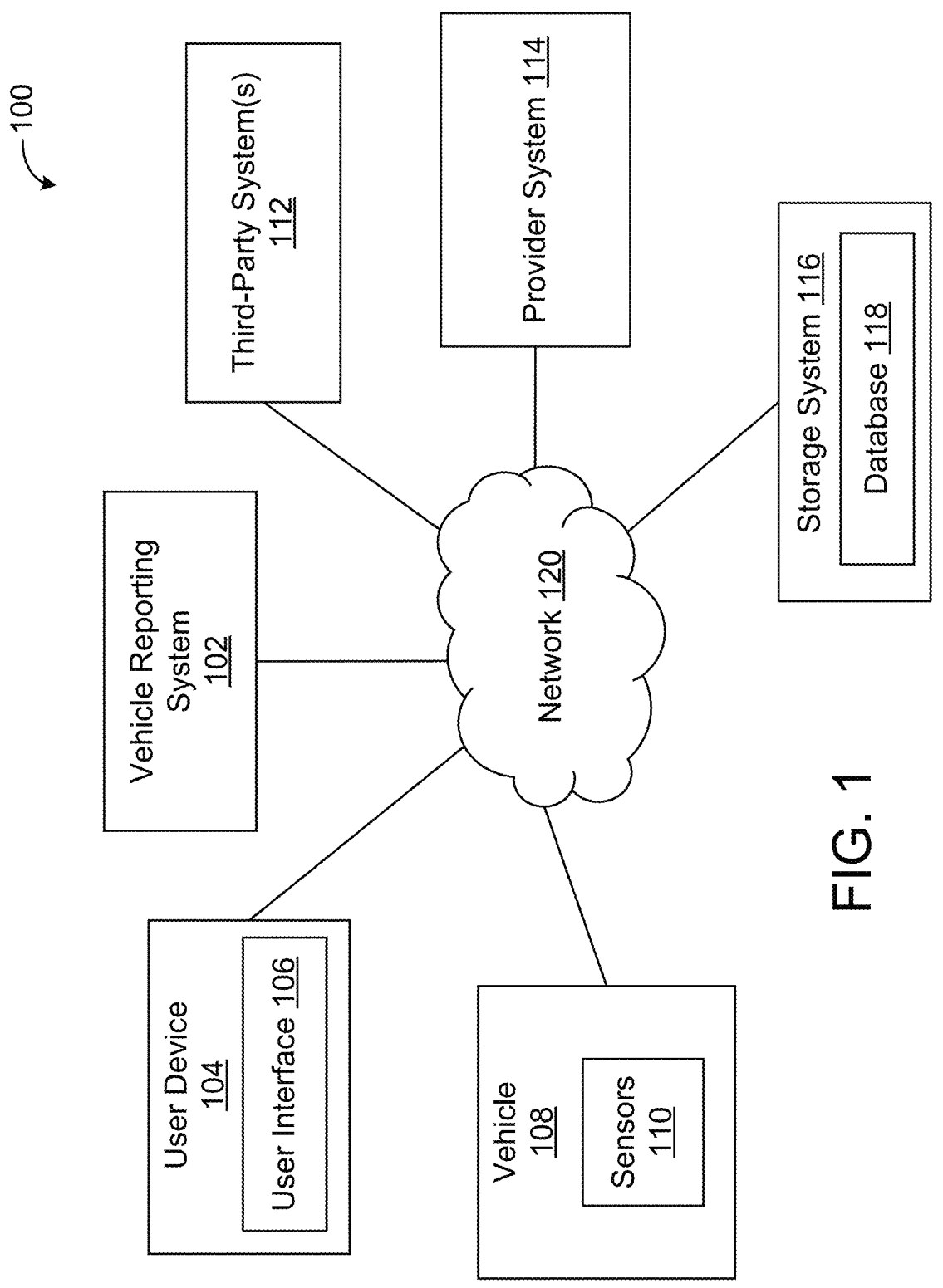
FIG. 1 is a block diagram of an exemplary enhanced vehicle reporting computer system, according to some embodiments.

The Figures depict preferred embodiments for purposes of illustration only. One skilled in the art will readily recognize from the following discussion that alternative embodiments of the systems and methods illustrated herein may be employed without departing from the principles of the present embodiments described herein.

DETAILED DESCRIPTION

The present embodiments relate to, inter alia, an enhanced vehicle reporting computer system that generates enhanced vehicle reports pertaining to various vehicles. For instance, the enhanced vehicle reports may include vehicle indicators for various individual driving characteristics, vehicle recommendations for the vehicle, and indications of how driving habit changes and performing maintenance may affect a value of the vehicle.

The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, InstructGPT bots, Codex bots, Google Bard bots, and/or other electronic or electrical components, which may be in wired or wireless communication with one another. The computer system may include additional, less, or alternate functionality and/or operations, including that discussed elsewhere herein.
Overview Referring to the Figures, computer systems and computer-implemented methods for generating and/or providing enhanced vehicle reports may be provided. For example, the computer system may be configured to receive vehicle usage information from a variety of sources pertaining to a given vehicle. The computer system may generate various user interfaces having vehicle reporting information and recommendations including vehicle indicators and vehicle recommendations. Accordingly, the user interfaces may be presented to users, such as on a user mobile device or other computing device, displaying the enhanced vehicle reports. The user interfaces may further be interacted with to allow the users to obtain various raw data pertaining to driving characteristics associated with the vehicle indicators. Additionally or alternatively, the enhanced vehicle reports may be provided, presented, or outputted to a user in various other manners, such as audibly via a voice bot or chatbot, or visually or graphically via a computing device display, such as a mobile device, VR headset, AR glasses, a smart vehicle control console or display, or other computing devices, including those mentioned elsewhere herein.

Traditional vehicle history reporting systems have offered limited insight into a vehicle's actual usage. For example, these systems do not track or maintain vehicle telematics data, location data, or various other driving data. These systems are generally further limited by their reliance on third parties to provide accurate information. Lack of accurate and complete vehicle driving and usage data in vehicle history reports make evaluating used vehicles difficult for prospective used vehicle buyers. Additionally, for prospective sellers of used vehicles, this lack of information makes it difficult to showcase the vehicle's driving history and thereby identify situations in which the manner in which a vehicle has been operated suggest it is less likely to experience maintenance or other wear-and-tear issues than other vehicles with similar mileage that may have been driven in a different manner (e.g., suggesting a higher value for the vehicle).

The computer systems and computer-implemented methods described herein allow users (e.g., customers) to aggregate their vehicle's telematics data and/or connected-car driving history data into an online database or scorecard that can easily be made available to prospective buyers of their vehicle. This data can provide a variety of additional insights into the quality and/or value of their vehicle that have not traditionally been captured and/or reported. These data and insights can then be provided to used vehicle purchasers, sellers, dealerships, etc., to aid in the transparent sale of used vehicles.

In some embodiments, the telematics data may be captured by a driving monitoring sensor installed within the vehicle as part of a driving habit-based insurance rate adjustment program offered by a protective service provider (e.g., an insurance provider). Accordingly, in some embodiments, the availability of this marketable data product may further incentivize the adoption of driving habit-based insurance rate adjustment programs by policy holders who wish to bolster the resale value of their vehicles. Further, the availability of this level of vehicle history information may provide a significantly higher level of transparency to prospective buyers when making a vehicle purchase.

Beneficially, the computer systems and computer-implemented methods described herein may provide technical solutions to technical problems by combining and cross-correlating telematics data, location data, vehicle history data, and/or a variety of additional vehicle data from disparate sources to generate and provide vehicle recommendations and insights related to how performing recommended actions may affect the health, quality, and/or value of the user's vehicle throughout the lifetime of the vehicle that have not been traditionally available. These vehicle recommendations and insights may preemptively flag poor driving habits and/or maintenance habits for users and also allow for the users to better understand how their driving habits, vehicle maintenance, and other vehicle-related actions affect their vehicle. Further, the vehicle recommendations and insights may allow for users to proactively take steps to retain and improve the health, quality, and/or value of their vehicles.

Exemplary Enhanced Vehicle Reporting Computer System

Referring to FIG. 1, a block diagram of an exemplary enhanced vehicle reporting computer system, shown as enhanced vehicle reporting system 100, is shown, according to some embodiments. The enhanced vehicle reporting system 100 may include a vehicle reporting computer system, shown as vehicle reporting system 102, a user device 104 having a user interface 106, and at least one vehicle, shown as vehicle 108 having one or more sensors 110. The enhanced vehicle reporting system 100 may also include one or more third-party systems 112 associated with various third-party entities (e.g., a vehicle history report service provider, used vehicle dealerships/sales entities). The enhanced vehicle reporting system 100 may also include a provider system 114 associated with a provider (e.g., a provider of goods and/or services). The enhanced vehicle reporting system 100 may also include a storage system 116 having a database 118. The components of the enhanced vehicle reporting system 100 may be connected, in wired or wireless communication, via a network 120. It should be noted that the number and type of components shown is merely illustrative and, in some embodiments, implementations of the enhanced vehicle reporting system 100 may have additional, fewer, and/or different components than those illustrated in FIG. 1, including those mentioned elsewhere herein.

In some embodiments, the vehicle reporting system 102 may be associated with a vehicle reporting company or entity that provides vehicle reporting services to one or more users or operators (e.g., a user or operator associated with the user device 104), a company or service provider (e.g., a used vehicle sales entity associated with the third-party system 112), and/or various other entities interested in obtaining information pertaining to used vehicles.

As will be discussed in greater detail below, the vehicle reporting system 102 may be configured to generate and/or provide (such as visually or audibly via one or more computing devices) one or more vehicle reporting interfaces providing various information and recommendations pertaining to one or more vehicles (e.g., the vehicle 108). For example, the vehicle reporting system 102 may be configured to receive vehicle usage information pertaining to the vehicle (e.g., vehicle service history information, vehicle telematics information, driving monitoring information, etc.). The vehicle reporting system 102 may generate (e.g., using the vehicle usage information) one or more vehicle indicators providing information associated with different categories of vehicle usage (e.g., driving characteristics related to how the vehicle has been driven). The vehicle reporting system 102 may additionally generate (e.g., using the vehicle usage information) one or more vehicle recommendations, such as, for example, recommended driving habit changes and/or recommended maintenance actions, as well as indications of how those changes and/or actions may affect a value of the vehicle. The vehicle reporting system 102 may further generate various user interfaces including the vehicle indicators and vehicle recommendations to be displayed to a variety of users. For example, the generated user interfaces can be provided to prospective buyers and sellers of used cars, such as individual persons and/or used car sales entities.

In some embodiments, the vehicle reporting system 102 may be implemented using cloud computing services. In some embodiments, the vehicle reporting system 102 may be implemented using one or more computing devices, for example, operating alone and/or in combination. In some embodiments, the vehicle reporting system 102 may be implemented using computing architectures like multiple distributed servers, and/or similar computing devices and/or systems. In some embodiments, the vehicle reporting system 102 may be another suitable computing system, for example distributed across multiple systems or devices (e.g., which may be located within a single building or facility, or distributed across multiple different buildings or facilities), or within a single computer (e.g., one server, housing, etc.). All such implementations are contemplated herein.

As shown, the vehicle reporting system 102 may be configured to communicate with the user device 104. The user device 104 may include one or more human-machine interfaces or client interfaces, shown as user interface 106 (e.g., a graphical user interface, a text-based computer interface, a client-facing web service, a web service that provides pages to a web client, etc.), for example for controlling, viewing, and/or otherwise interfacing with the vehicle reporting system 102. The user device 104 may include a personal mobile computing device (e.g., a smart phone, a tablet, a mobile device, a wearable, smart glasses, a smart watch, etc.). The user device 104 may include a computer workstation, a client terminal, a remote or local interface, and/or any other user interface device. The user device 104 may be a stationary terminal (e.g., a desktop computer, a laptop computer, a tablet, or another suitable non-mobile device).

In some embodiments, information/data associated with the user device 104 may be communicated to the vehicle reporting system 102. In some embodiments, the user device 104 itself may be configured to communicate information/data to the vehicle reporting system 102. In some embodiments, a device coupled to the user device 104, a component implemented with the user device 104, an application or program housed and/or executed on the user device 104, and/or another suitable component associated with the user device 104 may be configured to communicate information/data to the vehicle reporting system 102.

The vehicle reporting system 102 may also be configured to receive information/data associated with the user device 104. For example, the user device 104 may (e.g., automatically, or in response to an input from a user or operator, etc.) communicate geolocation and/or vehicle telematics data (for instance, vehicle telematics data may include acceleration, braking, cornering, location, heading, speed, GPS, lane information, route, direction, driver, passenger, and/or other driving data) associated with the user device 104 to the vehicle reporting system 102. For example, the user device 104 may communicate information associated with a location of the user device 104, a speed and/or direction of movement of the user device 104, a starting/ending location of the user device 104 during a travel event, and/or other similar geolocation and/or telematics data. The user device 104 may communicate real-time and/or historic geolocation and/or telematics data associated with the user device 104 to the vehicle reporting system 102.

In some embodiments, a user or operator may opt-in to sharing geolocation and/or telematics data with the vehicle reporting system 102, such that the user device 104 communicates geolocation and/or telematics data to the vehicle reporting system 102 at predetermined times (e.g., hourly, daily, weekly, etc.), in predetermined locations (e.g., in an identified geofenced location, for example when "at home" or "at work," etc.), during use of predetermined applications, services, and/or interfaces associated with the user device 104 (e.g., a navigation/map application, a transportation or rental application, etc.), and/or other similar scenarios.

In some embodiments, the vehicle reporting system 102 may be configured to receive information/data associated with the vehicle 108. For example, the vehicle reporting system 102 may receive geolocation and/or telematics data associated with the vehicle 108. The geolocation and/or the telematics data may be captured via one or more sensors 110 associated with the vehicle 108. For example, the sensors 110 may include driving monitoring sensors installed within the vehicle 108 (e.g., provided by a provider associated with the provider system 114) and/or various native sensors of the vehicle 108 (e.g., connected vehicle data sensors).

In some embodiments, the sensors 110 are configured to monitor driving habits of a driver of the vehicle 108 and/or other vehicle usage information associated the vehicle 108. For example, the sensors 110 can monitor a frequency of use of the vehicle 108, driving characteristics and driving events of the vehicle 108. The driving characteristics and driving events monitored by the sensors 110 may include highway mileage vs. city mileage, average speeds, braking characteristics, acceleration characteristics, corning events, impact events and/or crash detection, average trip times, engine hours, towing mode activation, traction control deactivation, location data, etc. The sensors 110 may additionally or alternatively monitor various vehicle characteristics associated with the vehicle 108. For example, the vehicle characteristics monitored by the sensors 110 may include service log details (e.g., time between oil changes, oil life percentage at point of oil changes, etc.), average temperatures of components of the vehicle 108 (e.g., engine temperature, oil temperature, etc.), engine readings (e.g., oil quality, oil pump force, etc.), etc.

As shown, the vehicle reporting system 102 may be configured to receive information/data associated with the third-party system 112. While the enhanced vehicle reporting system 100 is shown to include one third-party system 112, it is contemplated herein that the enhanced vehicle reporting system 100 may include a plurality of third-party systems 112. In some embodiments, the third-party system 112 may be associated with a third-party service providers, such as, for example, a vehicle history reporting service provider (e.g., the National Motor Vehicle Title Information System (NMVTIS)). For example, the third-party system 112 may independently track, monitor, and provide various vehicle history information pertaining to a plurality of vehicles (e.g., vehicles registered in the United States) to the vehicle reporting system 102. The vehicle history information for each vehicle provided by the third-party system 112 may include a number of previous owners, registration information (e.g., registration locations), brand records associated with the vehicle (e.g., recall records for brands), junk and salvage records, insurance records, a vehicle usage type (e.g., owned, leased, taxi, collector), maintenance records, collision records (e.g., if reported), title information, odometer information, etc.

In various embodiments, the vehicle reporting system 102 may be configured to transmit information/data associated with one or more vehicles (e.g., the vehicle 108) to the third-party systems 112. For example, the third-party systems 112 may include one or more used car dealerships, sales entities, used car information purveyor entities, etc., and the vehicle reporting system 102 may be configured to transmit vehicle reports and/or vehicle usage information to the third-party systems 112 to be used in valuing used cars and/or passed through to end customers interested in obtaining information about used vehicles.

As shown, information/data associated with the provider system 114 may be communicated to the vehicle reporting system 102. In some embodiments, the provider system 114 may be configured to communicate information/data to the vehicle reporting system 102. In some embodiments, a device coupled to, a component implemented with the provider system 114, an application or program housed and/or executed on the provider system 114, and/or another suitable component associated with the provider system 114 may be configured to communicate information/data to the vehicle reporting system 102.

In some embodiments, the provider system 114 may be associated with a company or entity that provides protective services (e.g., insurance, etc.) to a user or operator (e.g., a user or operator associated with the user device 104), a company or service provider (e.g., OEM or a provider associated with the third-party system 112), and/or over one or more products or services (e.g., associated with the vehicle 108, etc.). In some embodiments, the provider system 114 may include or otherwise incorporate the vehicle reporting system 102 and/or the functionality thereof.

In some embodiments, the provider system 114 may independently monitor various vehicle usage information of the vehicle 108 via one or more of the sensors 110, such as one or more driving monitoring sensors provided by the provider and installed within the vehicle 108 for use in monitoring driving habits of a user (e.g., for use in modifying one or more vehicle insurance policies). Accordingly, the provider system 114 may provide the vehicle usage information collected from the vehicle 108 to the vehicle reporting system 102.

As shown, the vehicle reporting system 102 may be configured to communicate with the storage system 116 having the database 118. In some embodiments, the vehicle reporting system 102 communicates with the storage system 116, either directly (e.g., via the network 120) or indirectly (e.g., via the user device 104, the provider system 114, etc.). The storage system 116 may include one or more devices (e.g., RAM, ROM, Flash memory, hard disk storage, etc.) for storing data and/or computer code for implementing and/or facilitating the various processes, layers, and/or circuits described herein. The storage system 116 may be or include volatile memory or non-volatile memory, and may include database components, object code components, script components, and/or any other type of information structure for supporting the various activities and information structures described herein.

In some embodiments, the storage system 116 may be owned and/or operated by a vehicle data company (e.g., a vehicle data clearinghouse) or an entity associated with the vehicle reporting system 102 (or the provider associated with the provider system 114 if the vehicle reporting system 102 is incorporated therein). Accordingly, the vehicle reporting system 102 (or the provider system 114 or multiple provider systems similar to the provider system 114) may collect, store, and retrieve information from a variety of sources (e.g., the vehicle reporting system 102, the user device 104, the vehicle 108, the third-party systems 112, the provider system 114) within and from the database 118 to be utilized when performing the various functionalities described herein. In some instances, the vehicle reporting system 102 (or the provider associated with the provider system 114 if the vehicle reporting system 102 is incorporated therein) may be configured to aggregate vehicle telematics data and/or connected vehicle data pertaining to a plurality of vehicles from a plurality of entities (e.g., multiple insurers, multiple manufactures, multiple reporting agencies). In some instances, this increased number of data sources may improve the accuracy of the various determinations and vehicle reports described herein.

In some embodiments, some, or all, of the components of the vehicle reporting system 102, the user device 104, the vehicle 108, the third-party system 112, the provider system 114, the storage system 116, and/or the network 120 may be integrated within a single device or be distributed across multiple separate systems or devices. In some embodiments, various components of the vehicle reporting system 102, the user device 104, the vehicle 108, the third-party system 112, the provider system 114, the storage system 116, and/or the network 120 may be components of a controller, a device controller, a field controller, a computer workstation, a client device, and/or another system or device that receives, processes, and/or communicates data from/to devices or other data sources.

Exemplary Vehicle Reporting System

Figure 2:
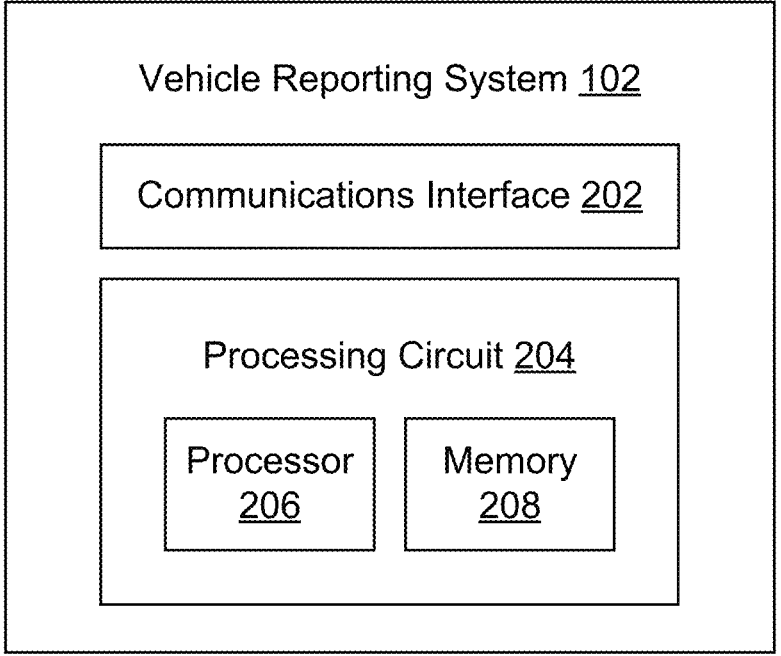
FIG. 2 is a block diagram of an exemplary vehicle reporting system, according to some embodiments.

Referring to FIG. 2, the vehicle reporting system 102 may include a communications interface 202 and a processing circuit 204 having a processor 206 and a memory 208. The communications interface 202 may include wired or wireless communications interfaces (e.g., jacks, antennas, transmitters, receivers, transceivers, wire terminals, etc.) for communicating data between the vehicle reporting system 102 and external systems or devices (e.g., the user device 104, the vehicle 108, the third-party system 112, the provider system 114, the storage system 116, etc.). In some embodiments, the communications interface 202 facilitates communications between the vehicle reporting system 102 and one or more external applications and/or interfaces (e.g., the user interface 106), for example to allow a remote user or operator to control, monitor, and/or adjust components of the vehicle reporting system 102.

Further, the communications interface 202 may be configured to communicate with external systems and/or devices using any of a variety of communications protocols (e.g., HTTP(S), WebSocket, CoAP, MQTT, etc.) and/or any of a variety of other protocols. Advantageously, the vehicle reporting system 102 may obtain, ingest, and process data from any type of system or device, regardless of the communications protocol used by the system or device.

As shown, the vehicle reporting system 102 may include the processing circuit 204 having the processor 206 and the memory 208. While shown as single components, it should be appreciated that the vehicle reporting system 102 may include one or more processing circuits, including one or more processors and memory.

In some embodiments, the vehicle reporting system 102 may include a plurality of processors, memories, interfaces, and/or other components distributed across multiple devices or systems, which are communicably coupled via a network (e.g., the network 120). For example, in a cloud-based or distributed implementation, the vehicle reporting system 102 may include multiple discrete computing devices, each of which include a processor 206, memory 208, communications interface 202, and/or other components of the vehicle reporting system 102. Tasks performed by the vehicle reporting system 102 may be distributed across multiple systems or devices, which may be located within a single building or facility or distributed across multiple buildings or facilities. In other embodiments, the vehicle reporting system 102 itself may be implemented within a single computer (e.g., one server, one housing, etc.). All such implementations are contemplated herein.

The processor 206 may be a general purpose or specific purpose processor, an application specific integrated circuit (ASIC), one or more field programmable gate arrays (FP- GAs), a group of processing components, or other suitable processing components. The processor 206 may further be configured to execute computer code or instructions stored in the memory 208 or received from other computer readable media (e.g., USB or other local storage, network storage, a remote server, etc.).

The memory 208 may include one or more devices (e.g., memory units, memory devices, storage devices, etc.) for storing data and/or computer code for completing and/or facilitating the various processes described in the present disclosure. The memory 208 may include random access memory (RAM), read-only memory (ROM), hard drive storage, temporary storage, non-volatile memory, flash memory, optical memory, or any other suitable memory for storing software objects and/or computer instructions. In some embodiments, the memory 208 may include database components, object code components, script components, and/or any other type of information structure for supporting the various activities and information structures described in the present disclosure. The memory 208 may be communicably connected to the processor 206 via the processing circuit 204, and may include computer code for executing (e.g., by the processor 206) one or more processes described herein. When the processor 206 executes instructions stored in the memory 208, the processor 206 may configure the processing circuit 204 to complete such activities.

It should be appreciated that, in some embodiments, various additional components of the enhanced vehicle reporting system 100 (e.g., the user device 104, the vehicle 108, the third-party systems 112, the provider system 114, the storage system 116) may include similar components to those discussed above with respect to the vehicle reporting system 102 (e.g., a communications interface similar to the communications interface 202, a processing circuit similar to the processing circuit 204, a processor similar to the processor 206, a memory similar to the memory 208).

Exemplary Vehicle Reporting System Functionality

Figure 3:
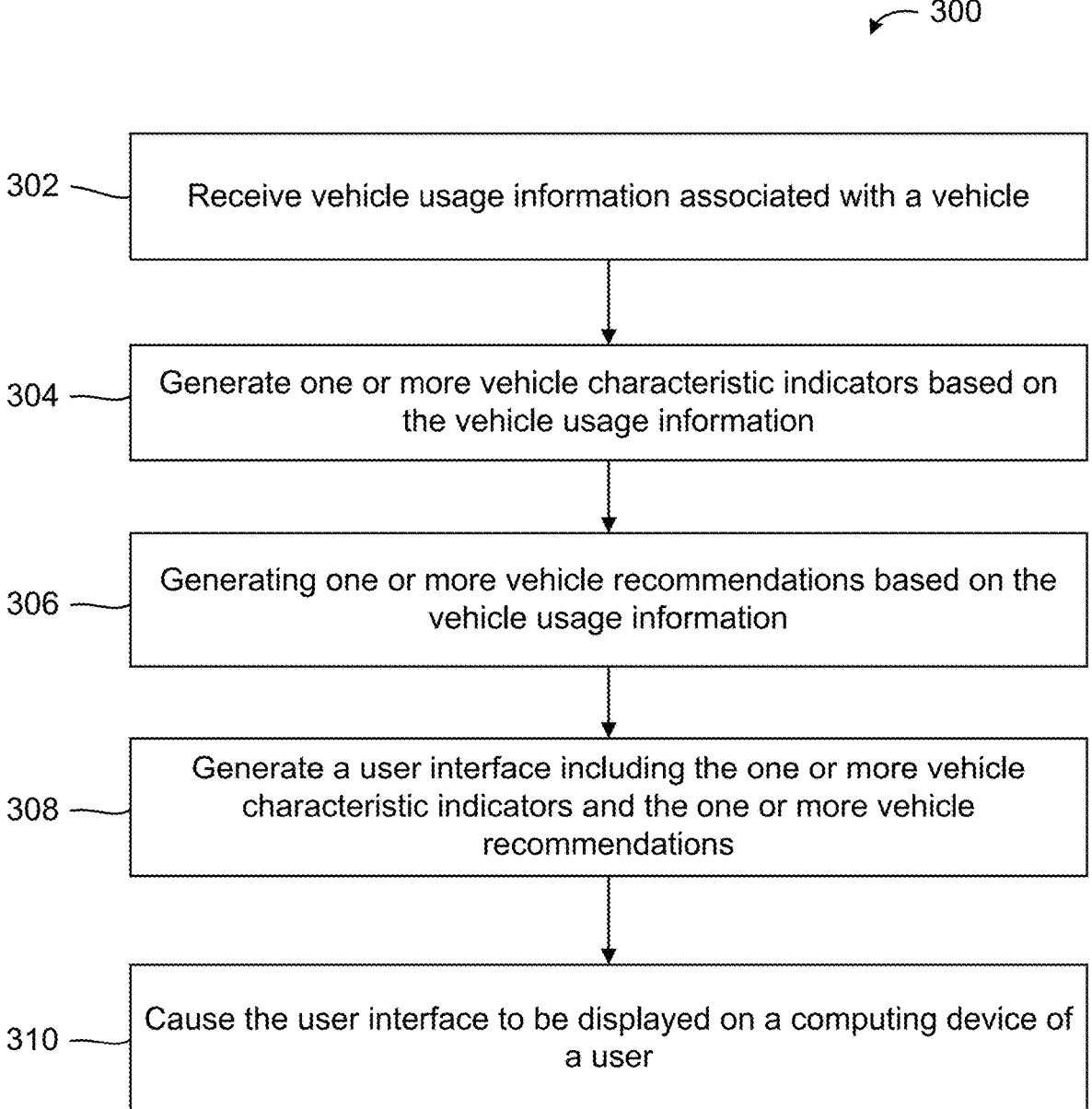
FIG. 3 is a flow diagram of an exemplary computer-implemented or computer-based process of providing a vehicle report, according to some embodiments.

Referring now to FIG. 3, a computer-implemented or computer-based process, shown as process 300, for providing and/or generating a vehicle report is shown, according to some embodiments. Computer-implemented process 300 may be implemented by any and/or all the components of the enhanced vehicle reporting system 100 of FIGS. 1-2 (e.g., the processing circuit 204 of the vehicle reporting system 102, etc.). It should be appreciated that any and/or all the process 300 may be implemented by other systems, devices, and/or components (e.g., components of the enhanced vehicle reporting system 100, the vehicle reporting system 102, etc.). Further, it should be appreciated that in some embodiments, process 300 may implemented using additional, different, and/or fewer operations, actions, and/or functionality.

Computer-implemented process 300 may include receiving vehicle usage information associated with the vehicle 108 (block 302), according to some embodiments. In some embodiments, the vehicle usage information may include, for example, various vehicle telematics data (e.g., received directly or indirectly from the sensors 110 of the vehicle 108) and/or vehicle history information (e.g., received directly or indirectly from one or more of the third-party systems 112, the provider system 114, and/or the storage system 116). The vehicle telematics data and the vehicle history information received can include any of the various vehicle telematics data and vehicle history information described herein.

Computer-implemented process 300 may further include generating one or more vehicle indicators based upon the vehicle usage information (block 304), according to some embodiments. The vehicle indicators can provide information pertaining to a plurality of driving characteristic categories. For example, the vehicle indicators may provide information relating to acceleration habits, braking habits, cornering habits, average speeds, average trip times, types of driving performed (e.g., city, towing, highway), vehicle driving system mode activations and/or deactivations (e.g., activations and/or deactivations of a traction control mode, a towing or other transmission-type mode, a driving mode, etc.), frequency of use (e.g., identifying periods of non-use that may have a negative impact on vehicle quality or value), engine hours (e.g., some service vehicles may have high idle times), location of use (e.g., based upon tracked locational data associated with the vehicle 108 and/or locations where the vehicle 108 has been registered), collision records, detected impact events or crashes (e.g., potentially flagged or highlighted if different than detected impact events or crashes), a number of previous owners, registration information (e.g., registration locations), a vehicle usage type (e.g., owned, leased, taxi, collector), maintenance records, title information, odometer information, and/or any other type of collectable information pertaining to the vehicle 108.

In some embodiments, the vehicle indicators additionally provide information relating to how a given driving characteristic may affect a value or quality of the vehicle 108. In some embodiments, the effect a given driving characteristic may have on the value or quality of the vehicle 108 may be determined using one or more machine learning and/or artificial intelligence algorithms. For example, the one or more machine learning and/or artificial intelligence algorithms may be trained to assess how a given driving characteristic will affect a value or quality of the vehicle based upon how similar characteristics have affected the values and/or qualities of other vehicles (e.g., based upon vehicle sales prices, quality reviews, user feedback, etc.).

In some embodiments, the vehicle indicators may additionally include an overall vehicle health indicator. The overall vehicle health indicator may provide information regarding the vehicle's overall health, quality, and/or value. The overall vehicle health indicator may similarly be determined based upon a combination of the vehicle indicators and/or the vehicle usage data using one or more machine learning and/or artificial intelligence algorithms. For example, the one or more machine learning and/or artificial intelligence algorithms may be trained to assess the vehicle's overall health, quality, and/or value using similar information pertaining to other vehicles and/or feedback provided by a variety of users (e.g., mechanics, third-party vehicle assessors, used car sales entities). In some embodiments, the overall vehicle health indicator may place higher weights on certain driving characteristics (e.g., braking habits, acceleration habits, corning habits) when determining the overall vehicle health indicator.

In some embodiments, the vehicle indicators may be provided in a variety of visual formats. For example, the vehicle indicators may be provided as a characteristic score (e.g., a driving or usage score) for a particular driving category (e.g., a number between 1 and 100), a percentage breakdown (e.g., a percentage breakdown of types of driving performed), a gauge-type visual indicator (e.g., similar to a speedometer), a chart, a plot, a graph, a table, textual information, and/or any other type of indicator configured to convey information about a given vehicle usage category. In some embodiments, the vehicle indicators provide information on how a given vehicle usage characteristic has changed over time (e.g., trend information pertaining to the vehicle usage characteristic). In some embodiments, the vehicle indicators may additionally include indications of how a given driving characteristic and/or vehicle characteristic compares to other vehicles (e.g., "Your vehicle braking tendencies are better than 80% of other drivers").

In some embodiments, various vehicle characteristics and/or driving characteristics may be interrelated. Accordingly, certain vehicle indicators may be modified, updated, or otherwise changed based upon other related vehicle characteristics and/or driving characteristics. For example, typically long periods of non-use may negatively impact the vehicle's health, quality, and/or value. However, if a particular vehicle has been maintained or registered as a collector vehicle, long periods of non-use may be expected and may not affect the quality of the vehicle as heavily as normal-use vehicles. Accordingly, in this example, the non-use vehicle indicator may be provided with a note explaining this correlation or may be color-coded or otherwise annotated differently to indicate that these longer periods of non-use are less impactful on the overall quality of the vehicle due to its historical status as a collector vehicle.

Accordingly, the vehicle indicators described herein may allow users (e.g., customers) to track the value of their vehicle and understand how their driving habits are affect the value of the vehicle. Additionally, users may further interact with the vehicle indicators to obtain more granular (e.g., raw) data or information pertaining to each vehicle characteristic and/or driving characteristic associated with each vehicle indicator and/or a breakdown of how each vehicle indicator is generated (e.g., how a given characteristic score is calculated). For example, in some instances, vehicle characteristics and/or driving characteristics for each trip taken by the vehicle 108 may be given a trip-specific score, and the vehicle indicator may be an average of the trip-specific scores over time.

Computer-implemented process 300 may further include generating one or more vehicle recommendations based upon the vehicle usage information (block 306), according to some embodiments. The vehicle recommendations may be prompts for the user to take one or more actions with respect to the vehicle 108. The vehicle recommendations may include one or more indications regarding how the recommended actions will improve and/or reinforce the perceived or actual health, reliability, and/or value of the vehicle 108.

In some embodiments, the vehicle recommendations may be generated based upon the vehicle usage information and/or other information relevant to the vehicle 108 using one or more machine learning and/or artificial intelligence algorithms. For example, the one or more machine learning and/or artificial intelligence algorithms may be trained to generate vehicle recommendations based upon historical and/or continuously updated training information indicating actions taken by drivers in similar scenarios and how those actions affected the overall health or value of their vehicles.

In some embodiments, the vehicle recommendations may include one or more of recommended driving habit changes, recommended maintenance actions, and/or other recommended actions associated with the vehicle 108. As an example of a recommended driving habit change, if the vehicle usage information indicates that the user has a tendency for abruptly braking the vehicle 108 (e.g., and has a low score for a braking habit vehicle indicator), the vehicle recommendation may include a prompt indicating that the user's braking habits are negatively impacting the health, quality, and/or value of the vehicle 108 and that the user should work on braking more gradually. It will be appreciated that similar recommendations may be generated and provided to the user for any other types of driving habit characteristics described herein.

As an example of a recommended maintenance action, if the vehicle 108 needs a maintenance procedure (e.g., an oil change, a tire rotation, a tire pressure fill up, a check-engine light assessment), the vehicle recommendation may include a prompt indicating that the vehicle 108 needs the maintenance procedure performed and that the user should do this as soon as possible because waiting will negatively impact the health, quality, and/or value of the vehicle 108. It will be appreciated that recommendations may be generated and provided to the user for any of the various types of maintenance-related characteristics described herein and/or any other maintenance-related characteristics that may be captured relating to the vehicle 108. Further, beneficially, the recommended maintenance actions described herein may be based upon real-time vehicle telematics data as opposed to simple scheduled reminders at predetermined time frames based upon previous service events. That is, the recommended maintenance actions described herein may be provided in response to real-time vehicle telematics information, thereby enabling a more proactive and effective recommendation system than simple pre-scheduled maintenance reminders.

In some embodiments, the vehicle recommendations provided to the user may be location based. For example, if the vehicle 108 is generally driven in salt-prone areas (e.g., in cold-climate areas), the vehicle recommendations may include a recommendation for the user to more frequently wash the vehicle 108 to help retain the health, quality, and/or value of the vehicle 108. If the vehicle 108 is generally driven in a high-altitude environment or undergoes a high level of elevation change (e.g., based upon locational tracking data monitored against elevational mapping information), the vehicle recommendations may include a recommendation for the user to service the vehicle 108 more frequently to help retain the health, quality, and/or value of the vehicle 108. If the vehicle 108 is located within an area expecting flooding (e.g., based upon locational tracking data monitored against weather data gathered from one or more third-party weather service providers), the vehicle recommendations may include a recommendation for the user to move the vehicle 108 to higher ground.

In some embodiments, the vehicle recommendations may be based upon comparisons to other drivers within a given geographical proximity to the user and/or vehicle 108. For example, if the vehicle reporting system 102 determines that drivers within the given geographical proximity to the user and/or vehicle 108 rotate their tires with a higher frequency than the user has rotated the tires on the vehicle 108, the vehicle recommendation may include a recommendation for the user to rotate the tires more frequently (e.g., "Other users in your area rotate their tires more often than you. To ensure your vehicle retains its value, consider performing this maintenance action more frequently.").

Computer-implemented process 300 may further include generating a user interface (e.g., the user interface 106 of the user device 104) including the one or more vehicle indicators and the one or more vehicle recommendations (block 308), according to some embodiments. As will be described in detail below, in some embodiments, the user interface may be generated as part of an application provided by the vehicle reporting system 102. In some embodiments, the user interface may be generated by the vehicle reporting system 102. In these embodiments, the user interface may then be transmitted to the user device 104 (or the vehicle

108, the third-party system 112, the provider system 114). In some other embodiments, portions of the user interface (e.g., the vehicle indicators, the vehicle recommendations, etc.) or underlying data associated with portions of the user interface may be generated by the vehicle reporting system 102 and transmitted to the user device 104 (or the vehicle 108, the third-party system 112, the provider system 114), and the user device 104 (or the vehicle 108, the third-party system 112, the provider system 114) may generate the user interface.

Computer-implemented process 300 may further include causing the user interface to be displayed on a computing device to a user (block 310), according to some embodiments. For example, in some embodiments, the user interface may be displayed to a user via any of the vehicle reporting system 102, the user device 104, the third-party system 112, and/or the provider system 114.

Exemplary Vehicle Reporting Application and User Interface

Referring now to FIGS. 4A-4D, consecutive portions of a user interface (e.g., vehicle report dashboard page 400) of an application for monitoring and reporting vehicle information are shown, according to some embodiments. The application may be accessible on any suitable electronic device, such as a mobile phone, tablet, smart home device, watch, or any other computing device. For example, the application may be accessible on any of the vehicle reporting system 102, the user device 104, a user interface of the vehicle 108, the third-party system 112, the provider system 114. The application enables a user to, among other things, monitor and report vehicle information and receive various vehicle recommendations associated with a vehicle of the user (e.g., the vehicle 108).

In some embodiments, the application may be configured to communicate with various other software and/or applications on the computing devices of the user and/or the one or more other computing systems generally. For example, in some embodiments, the application may be able to access, retrieve data from, report data to, and/or or otherwise communicate with various other devices and systems described herein.

In the exemplary embodiment, the application can be configured to, inter alia, allow the user to receive and view a variety of information and recommendations relating to a vehicle (e.g., a vehicle the user owns, is trying to sell, or is interested in purchasing). For example, the application may allow for vehicle owners interested in selling their vehicle, now or in the future, to (1) take proactive measures to retain their vehicle's health, quality, and/or value and (2) easily provide extensive information regarding their vehicle's history at the time of selling the vehicle. The application may further allow for interested purchasers to easily obtain information about and analyze vehicles they are considering purchasing. In some instances, vehicle owners may opt in to the application to share the driving and usage history data associated with their vehicles as a way to enhance their vehicle's resale value. In some embodiments, this data could be anonymized and stored within a database (e.g., the database 118) to be used to provide reports to third-party buyers and sellers of used vehicles (e.g., for an associated fee).

FIGS. 4A-4D illustrate consecutive portions of a vehicle report dashboard page 400, according to some embodiments. The vehicle report dashboard page 400 may include a header 402 (shown in FIG. 4A). The header 402 may include a description (e.g., make, model, year) of the vehicle for which information is being displayed (e.g., the vehicle 108).

The vehicle report dashboard page 400 may additionally include various overall vehicle information widgets 404. For example, the overall vehicle information widgets 404 may include a total number of trips taken by the vehicle, a total amount of miles driven by the vehicle, an image of the vehicle, and an estimated current retail and/or trade-in sale value for the vehicle. In some embodiments, the overall vehicle information widgets 404 may further include a trend graphic showing the vehicles estimated trade-in and/or retail sale value for the vehicle over time. The overall vehicle information widgets 404 may further include various additional textual information indicating, for example, how much the estimated retail and/or trade-in value has changed over a given period of time (e.g., over the last month), as well as comparative information detailing how the estimated value of the vehicle compares to other similar vehicles within the same geographical region.

The vehicle report dashboard page 400 may additionally include a driving characteristic score widget 406, a miles makeup widget 408, an average speed widget 410, a non-use tracking widget 412, and a service log widget 414. Each of the driving characteristic score widget 406, the miles makeup widget 408, the average speed widget 410, the non-use tracking widget 412, and the service log widget 414 may include different types of vehicle indicators.

For example, the driving characteristic score widget 406 may include vehicle indicators in the form of a plurality of driving characteristic scores. The driving characteristic scores may be scores from 0 to 100 comparing the user's driving habits to other drivers in their area and/or various target driving habits (e.g., set by a user of the vehicle reporting system 102, by the user of the user device 104, a user of the third-party system 112, or a user of the provider system 114) over a given time period (e.g., the last five years). In some embodiments, the time period over which each driving characteristic score is calculated may be the same time period for each driving characteristic score or different time periods for each or some of the driving characteristic scores (e.g., depending on certain data availability). The driving characteristic scores may include an acceleration score, a braking score, and a speed score. It should be appreciated that similar driving characteristic scores may be generated and displayed within the driving characteristic score widget 406 for any driving habits that are monitored via the systems and methods described herein and/or for any other driving habits that are otherwise capable of being monitored and tracked over time.

The miles makeup widget 408 may include vehicle indicators in the form of a drive type percentage breakdown and information pertaining to each drive type utilized by the vehicle. For example, in some embodiments, the drive type percentage breakdown may include a visual pie chart-type depiction of the percentage breakdown between city driving, towing, and highway driving. In some embodiments, for each drive type utilized, the miles makeup widget 408 may further include an average speed utilized within that driving type and/or a top speed utilized within that driving type.

In certain scenarios, the percentage breakdown and associated information provided within the miles makeup widget 408 may be relevant for potential used car purchasers because it may be indicative of less or more rigorous driving conditions experienced by the vehicle. For example, in some instances, because highway driving is generally performed at higher speeds, it may wear engine components more quickly compared to city driving. On the other hand, in some instances, because city driving typically involves more braking and accelerating (e.g., accelerating away from vehicle stops), it may wear braking or engine systems more quickly compared to highway driving.

The average speed widget 410 may include vehicle indicators in the form of gauge-type visual indicators (e.g., similar to speedometers). For example, in some embodiments, the gauge-type visual indicators include visual indicators for city driving, highway driving, and towing. In some embodiments, each of the gauge-type visual indicators further include accompanying textual information including average and top speeds for each speed indicator.

The non-use tracking widget 412 may include vehicle indicators in the form of a bar chart showing days of non-use over time (e.g., grouped by year). In some embodiments, the days of non-use over time may be displayed using other types of data formatting, such as a plot, a graph, a table, etc. In any case, the non-use tracking widget 412 may be configured to conveniently show whether the user's vehicles has had any long periods of non-use that may be concerning to potential buyers. For example, in some circumstances, long periods of non-use may result in maintenance and/or longevity issues not present in similar continuously driven vehicles, such as if a vehicle was left in a non-use condition for a long period of time without proper preventative maintenance to avoid the non-use deteriorating certain components.

The service log widget 414 may include vehicle indicators in the form of a table detailing vehicle service events. Each service event entry in the table detailing the vehicle service events may include a date performed, a service task performed, person who performed the task, a person who completed the service task, a person who validated the service task, and a cost of the service task (e.g., material, labor, other costs, total).

The various vehicle indicators (e.g., the driving characteristic scores, the miles makeup visual pie chart-type visual indicator, the bar chart, the table) may be generated in a variety of manners. In some embodiments, the vehicle reporting system 102 may collect various telematics data from the vehicle 108 (e.g., accelerometer data, geolocation data, etc.) and perform various processing on the raw telematics data to generate the various vehicle indicators. For example, the vehicle reporting system 102 may calculate various statistical values relating to a given raw telematics data stream over a period of time (e.g., an average value, a median value, a maximum value, a minimum value, etc.) and compare the calculated statistical values to similar values from collected telematics data of other vehicles to generate a relative score for each driving characteristic (e.g., acceleration, braking, speed).

In some embodiments, the vehicle reporting system 102 may receive the raw telematics data from the vehicle 108 directly and process the raw telematics data locally to generate the various vehicle indicators discussed above. In some embodiments, the vehicle reporting system 102 may receive processed data and/or pre-calculated or pre-determined vehicle indicators from other systems (e.g., from the third-party system 112 and/or the provider system 114). In some embodiments, the raw telematics data may be partially processed locally by the vehicle reporting system 102 and partially processed remotely by other systems.

Figure 4A:
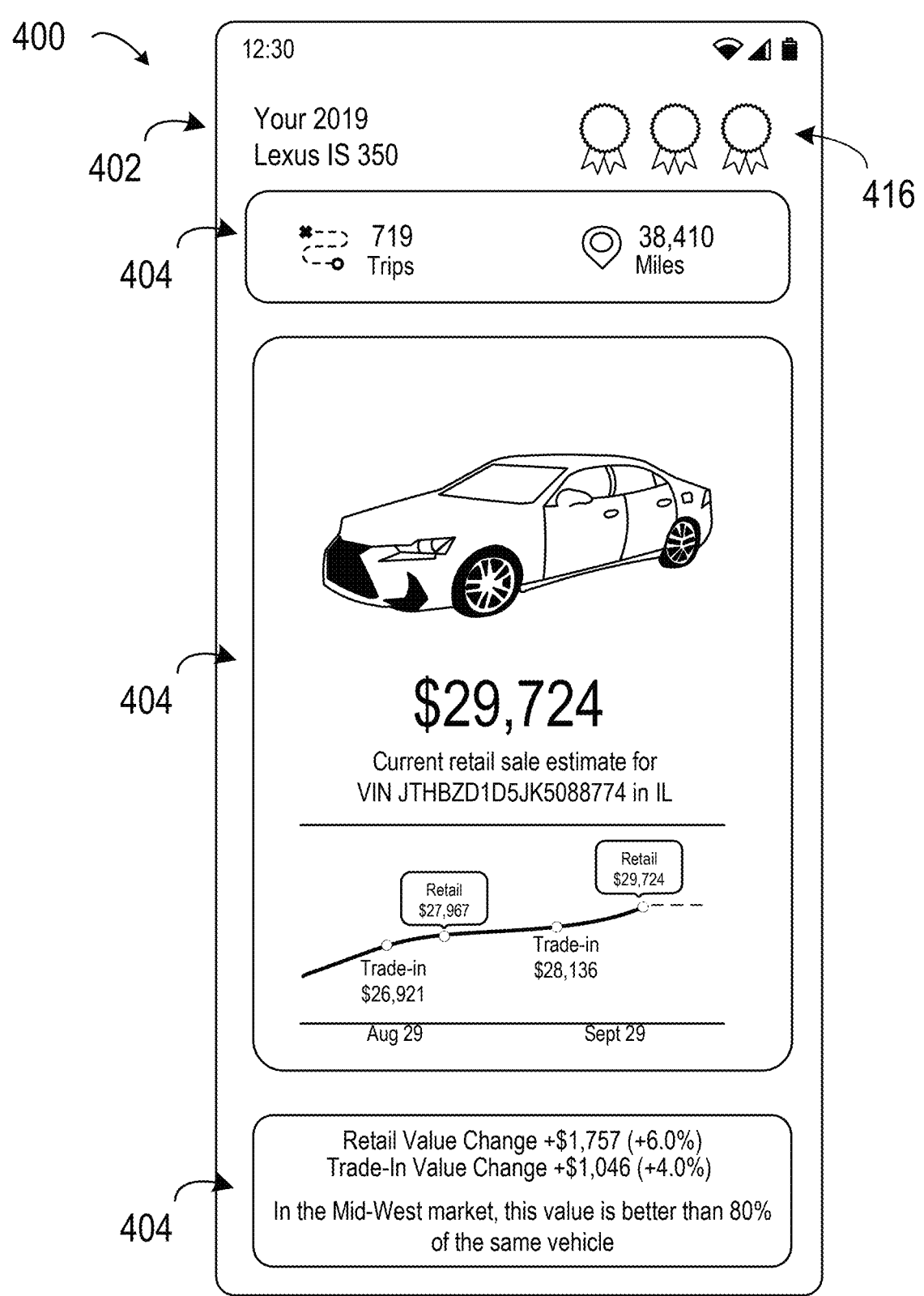
FIGS. 4A-4D are exemplary user interfaces including vehicle information associated with a vehicle for displaying to a user via a computing device, according to some embodiments.
Figure 4B:
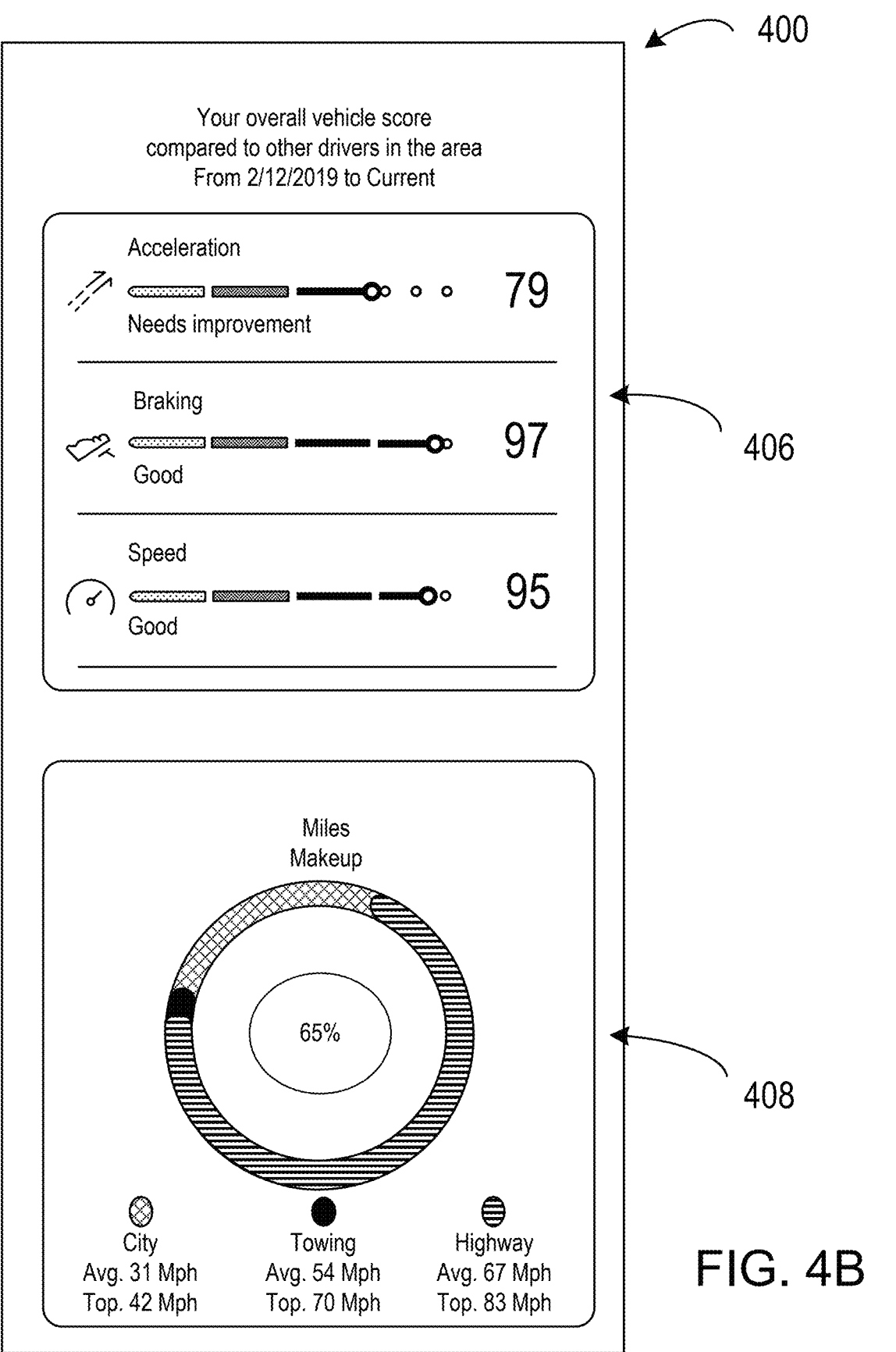
Figure 4C:
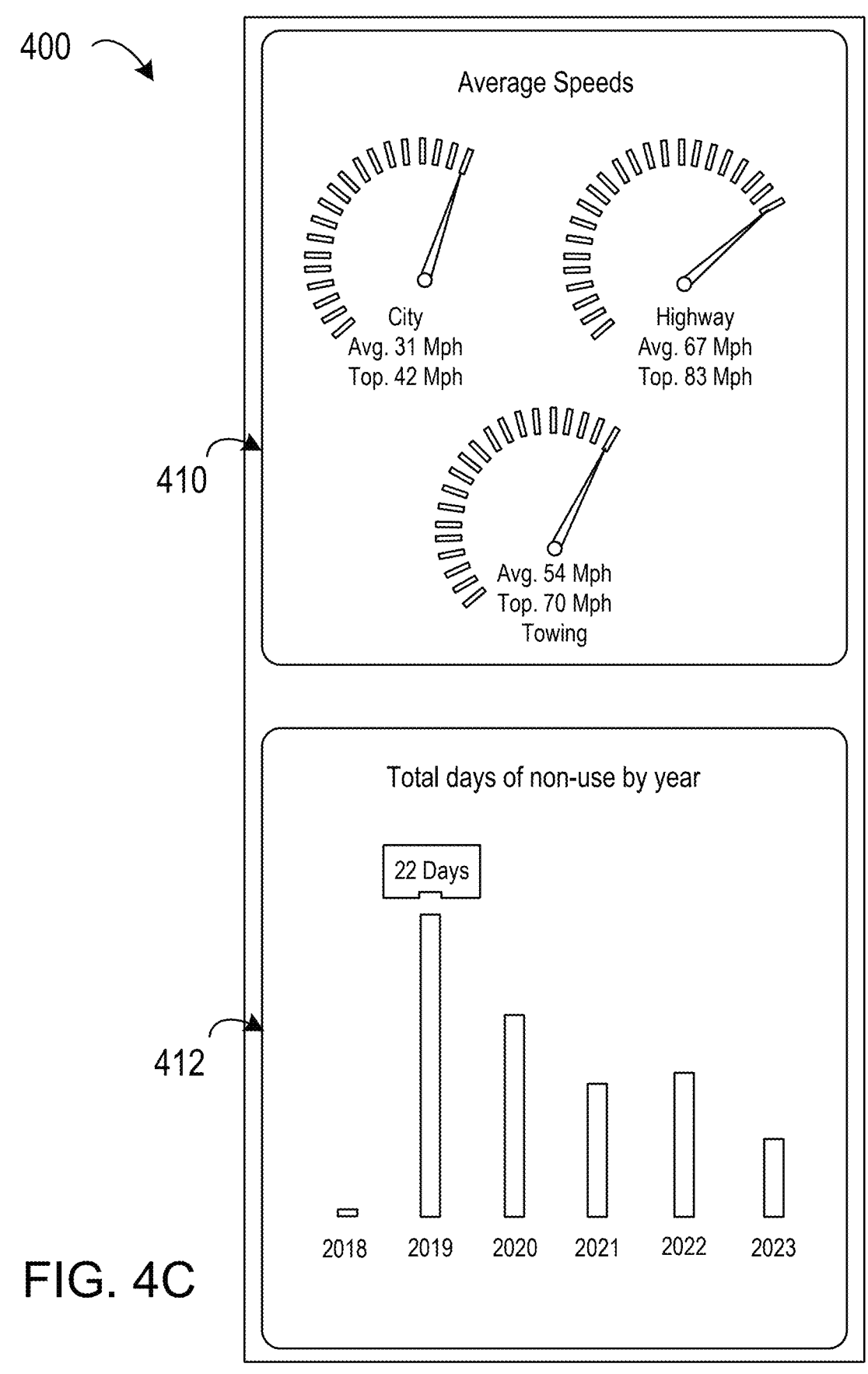
Figure 4D:
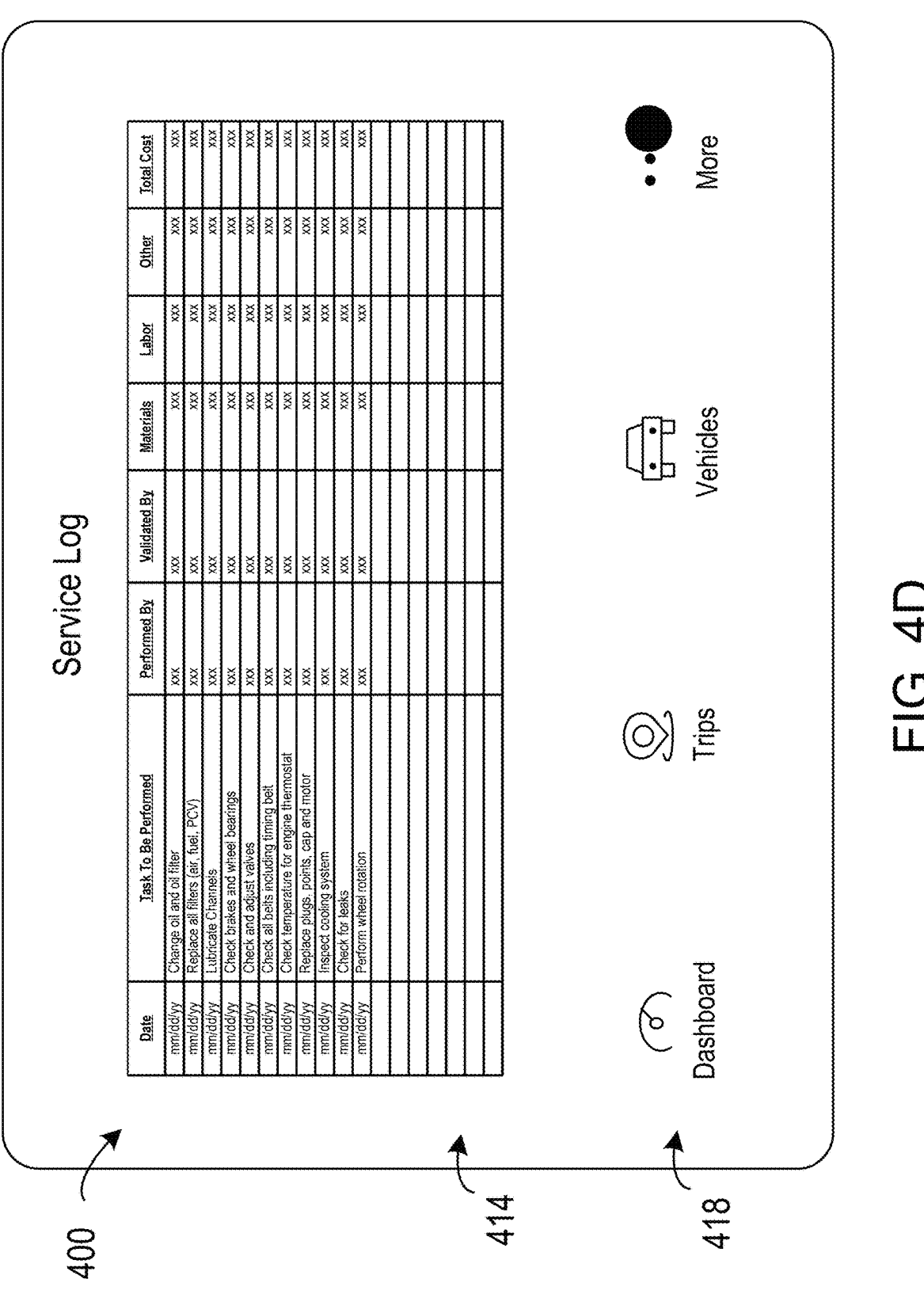

In some embodiments, the vehicle report dashboard page 400 may further include various badges 416 earned by the user (e.g., shown in FIG. 4A). For example, in some embodiments, users of the application may earn virtual badges (e.g., "Grocery Getter," "Highway Miler," "City Slicker," "Smooth Operator," "Service Champ") that incentivize good driving (e.g., slower cornering, more gradual braking, more gradual acceleration), usage trends (e.g., more highway mileage than city mileage, avoiding long periods of non-use, avoiding weather catastrophe locations, storing the vehicle indoors more than outdoors), and vehicle care behavior (e.g., timely maintenance, service intervals, tire inflation). In some embodiments, these badges may be displayed to prospective buyers viewing the application to show that the seller has taken good care of the vehicle.

In some embodiments, the virtual badges may each be generated or "earned" upon determining, via the vehicle usage information, that the user has achieved a particular badge-related goal or target for a particular behavior (e.g., driving behavior, maintenance behavior, tracked-location behavior). That is, in some instances, the vehicle reporting system 102 (e.g., the processing circuit 204) may determine that the vehicle usage information meets a pre-determined goal criteria (e.g., no accidents for four years, no harsh braking events for a month, driving within speed limits for a year) for one or more categories of vehicle usage and, in response, may generate and associate a badge corresponding to that particular goal criteria to be displayed within vehicle reports associated with the user's vehicle. Accordingly, in some instances, the badges may create a type of gamification that incentivizes users to drive better to earn the virtual badges.

In some embodiments, one of the badges may signify that the owner of the vehicle (e.g., the seller) is a participant in a driving habit-based insurance rate adjustment program offered by a protective service provider (e.g., an insurance company). This badge thereby ensures that any prospective buyers are aware that the vehicle owner has participated in the driving habit-based insurance rate adjustment program, which may signify to the prospective buyers that the vehicle owner was incentivized to drive better (e.g., lower cornering speeds, light braking and acceleration) during their owner-ship to avoid paying higher insurance rates, and thus more likely put less wear and tear on the vehicle.

In some instances, the badges and user vehicle may be displayed together in a digital twin setting. For example, in some instances, the user may be able to have a digital twin of the vehicle generated and displayed within a virtual landscape (e.g., a metaverse setting) within which the user and/or other users may view and interact with the digital twin of the vehicle. Accordingly, in these instances, the badges earned by the user may be displayed along with the digital twin of the vehicle to reflect the user's good vehicle usage habits with respect to the user's real vehicle.

The vehicle report dashboard page 400 may additionally include a navigation pane 418 configured to allow the user to view other information with the application (e.g., specific trip information, information pertaining to other vehicles, etc.).

In some embodiments, the vehicle report dashboard page 400 may further include one or more recommendation and/or vehicle information widgets including text-based vehicle recommendations and/or vehicle information associated with various vehicle indicators described herein. For example, the text-based recommendations and/or vehicle information may be provided in a similar format to the additional textual information shown within the overall vehicle information widgets 404 shown in FIG. 4A.

Regarding additional recommendation widgets, the recommendation widgets may provide recommendations including recommended driving habit changes, recommended maintenance actions, and/or any other recommended actions described herein. Regarding additional information widgets, in some embodiments, the vehicle reporting system 102 (e.g., the processing circuit 204) may be configured to identify and flag various information that would be relevant to prospective purchasers deciding whether to buy the vehicle.

As one example, the vehicle reporting system 102 may determine that, based upon the vehicle usage information and maintenance records pertaining to the vehicle, the vehicle owner habitually allowed the vehicle to fall below minimum oil life percentages and/or ignored warning codes displayed by the vehicle (e.g., ignored the check engine light being on) throughout the lifetime of the vehicle. Accordingly, the vehicle reporting system 102 may flag this habitual behavior to prospective buyers, as it may indicate a general low level of care toward the vehicle. In some instances, this same identification may be provided to the vehicle owner with an indication that this type of behavior may be reducing the health, quality, and/or value of the vehicle to allow the vehicle owner to improve their behavior.

Similarly, the vehicle reporting system 102 may determine that the maintenance and/or accident records for the vehicle do not match connected vehicle data and/or telematics data collected from the vehicle (e.g., the oil life was not reset properly during a scheduled oil change, a collision was not reported). Accordingly, the vehicle reporting system 102 may similarly flag this discrepancy for prospective buyers and/or the vehicle owner.

Similarly, in some embodiments, the vehicle reporting system 102 may cross-correlate vehicle location information with weather and/or catastrophe information (e.g., pulled from one or more third-party entities associated with the third-party systems 112 that monitor weather and/or catastrophe-related information). For example, the vehicle reporting system 102 may determine that the vehicle was located within geographical region while that geographical region experienced a severe weather event (e.g., a flood, a tornado, a hurricane) or another catastrophe (e.g. a wildfire, an earthquake). Accordingly, the vehicle reporting system 102 may similarly flag this information for prospective buyers.

In some embodiments, the vehicle reporting system 102 may be configured to cross-correlate various information to determine whether it would be potentially relevant to the vehicle owner and/or prospective buyers. For example, the vehicle reporting system 102 may determine that the user frequently turned off or deactivated the vehicle's traction control. In these instances, the user may frequently turn off or deactivate the vehicle's traction control for an unharmful reason, such as the user living in a winter climate and feeling uncomfortable in winter weather with the traction control on. Alternatively, if the user lives in a warm climate, the user may frequently turn off or deactivate the vehicle's traction control for a more damaging reason, such as the user performing burnouts or otherwise driving in a manner that would result in increased wear and tear on the vehicle. Accordingly, the vehicle reporting system 102 may be configured to make this determination and flag this information for the users upon determining that it would be relevant.

In some embodiments, similar to the vehicle recommendations, the determination of what information to provide to the users may be performed using one or more machine learning and/or artificial intelligence algorithms. For example, the one or more machine learning and/or artificial intelligence algorithms may be trained to identify pertinent information for displaying vehicle owners and/or prospective vehicle purchasers based upon historical and/or continuously updated training information indicating information requested, utilized, and/or otherwise flagged as relevant by vehicle owners and/or prospective vehicle purchasers.

In some embodiments, the various widgets of the vehicle report dashboard page 400 and/or the components of the various widgets may be selectable within the vehicle report dashboard page 400 to allow the user to obtain more granular (e.g., raw) data or information pertaining to each driving characteristic associated with each vehicle indicator, vehicle recommendation, and/or additional information provided to the user. The user may also, via interaction with the vehicle report dashboard page 400, be provided with a breakdown of how each vehicle indicator, vehicle recommendation, and/or additional information is generated (e.g., how a given characteristic score is calculated, why a vehicle recommendation was triggered, why the user is seeing additional information).

Accordingly, the application and user interfaces generated and/or otherwise maintained by the vehicle reporting system 102 and provided to the various other devices and computing systems of the enhanced vehicle reporting system 100 provide both a self-monitoring dashboard for users to view their own vehicle history and vehicle recommendations and a reporting dashboard for users to view vehicle history information of vehicles for sale. While the user interface (e.g., the vehicle report dashboard page 400) is shown as a graphical user interface, in some embodiments, the application described herein may additionally or alternatively include a chat bot type interface that allows for users to ask questions pertaining to their vehicles and/or the vehicles of others using natural-language text inputs, verbally spoken inputs, etc.

In various embodiments, the application and user interfaces discussed above, with respect to FIG. 4, may be provided as part of a driving habit-based insurance rate adjustment program offered by a protective service provider (e.g., an insurance provider) associated with the vehicle reporting system 102, the third-party system 112, or the provider system 114. In some other embodiments, the application and user interfaces discussed above, with respect to FIG. 4, may be provided as part of a vehicle reporting service (e.g., for use by used car sellers and/or purchasers) offered by a vehicle history reporting entity associated with the vehicle reporting system 102, the third-party system 112, or the provider system 114. In yet some other embodiments, the application and user interfaces discussed above, with respect to FIG. 4, may be provided as part of a vehicle monitoring service (e.g., for use by used car owners) offered by a vehicle quality, health, and/or value monitoring entity associated with the vehicle reporting system 102, the third-party system 112, or the provider system 114.

Exemplary Machine Learning and Generative AI

As discussed elsewhere, some embodiments may utilize machine learning, generative artificial intelligence, or other advanced computing techniques. As such, in some embodiments, generative artificial intelligence (AI) models (also referred to as generative machine learning (ML) models) and/or other AI/ML models discussed herein may be implemented via and/or coupled to one or more voice bots and/or chatbots that may be configured to utilize artificial intelligence and/or machine learning techniques. For instance, the voice and/or chatbot may be a ChatGPT chatbot and/or a ChatGPT-based bot. The voice and/or chatbot may employ supervised, unsupervised, and/or semi-supervised machine learning techniques, which may be followed by, and/or used in conjunction with, reinforced and/or reinforcement learning techniques. The voice bot, chatbot, ChatGPT bot, ChatGPT-based bot, and/or other such generative model may generate audible or verbal output, text or textual output, visual or graphical output, output for use with speakers and/or display screens of a mobile computing device, and/or other types of output for user and/or other computer or bot consumption.

Noted above, in some embodiments, a chatbot or other computing device may be configured to implement machine learning, such that the computing device "learns" to analyze, organize, and/or process data without being explicitly programmed. Machine learning and/or artificial intelligence may be implemented through machine learning methods and algorithms. In one exemplary embodiment, a machine learning module may be configured to implement the ML methods and algorithms.

As used herein, a voice bot, chatbot, ChatGPT bot, ChatGPT-based bot, and/or other such generative model (referred to broadly as "chatbot" herein) may refer to a specialized system for implementing, training, utilizing, and/or otherwise providing an AI or ML model to a user for dialogue interaction (e.g., "chatting"). Depending on the embodiment, the chatbot may utilize and/or be trained according to language models, such as natural language processing (NLP) models and/or large language models (LLMs). Similarly, the chatbot may utilize and/or be trained according to generative adversarial network (GAN) techniques, such as the machine learning techniques, algorithms, and systems described in more detail below.

The chatbot may receive inputs from a user via text input, spoken input, gesture input, etc. The chatbot may then use AI and/or ML techniques as described herein to process and analyze the input before determining an output and displaying the output to the user. Depending on the embodiment, the output may be in a same or different form than the input (e.g., spoken, text, gestures, etc.), may include images, and/or may otherwise communicate the output to the user in an overarching dialogue format.

In various embodiments, at least one of a plurality of ML methods and algorithms may be applied to implement and/or train the chatbot, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, a chatbot ML module employs supervised learning, which involves identifying patterns in existing data to make predictions about subsequently received data. Specifically, the chatbot ML module may be "trained" using training data, which includes example inputs and associated example outputs. Based upon the training data, the chatbot ML module may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiment, a processing element may be trained by providing it with a large sample of data with known characteristics or features.

In another embodiment, the chatbot ML module may employ unsupervised learning, which involves finding meaningful relationships in unorganized data. Unlike supervised learning, unsupervised learning does not involve user-initiated training based upon example inputs with associated outputs. Rather, in unsupervised learning, the chatbot ML module may organize unlabeled data according to a relationship determined by at least one ML method/algorithm employed by the chatbot ML module. Unorganized data may include any combination of data inputs and/or ML outputs as described above.

In yet another embodiment, the chatbot ML module may employ semi-supervised learning, which involves using thousands of individual supervised machine learning iterations to generate a structure across the multiple inputs and outputs. In this way, the chatbot ML module may be able to find meaningful relationships in the data, similar to unsupervised learning, while leveraging known characteristics or features in the data to make predictions via a ML output.

In yet another embodiment, the chatbot ML module may employ reinforcement learning, which involves optimizing outputs based upon feedback from a reward signal. Specifically, the chatbot ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

In certain embodiments, the chatbot ML module may be used in conjunction with the machine vision, image recognition, object identification, AR glasses, VR headsets, other input/output devices, and/or other image processing techniques discussed below. Additionally or alternatively, in some embodiments, the chatbot ML module may be configured and/or trained to implement one or more aspects of the machine vision, image recognition, objection identification, and/or other image processing techniques discussed below.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied, or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In some embodiments, a computer program is provided, and the program is embodied on a computer readable medium. In some embodiments, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The construction and arrangement of the systems and methods as shown in the various example embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied, and the nature or number of discrete elements or positions can be altered or varied. Accordingly, all such modifications are intended to be included within the scope of the present disclosure. The order or sequence of any process or method operations, actions, or functionality may be varied or re-sequenced according to alternative embodiments. Other substitutions, modifications, changes, and omissions can be made in the design, operating conditions, and arrangement of the example embodiments without departing from the scope of the present disclosure.

As used herein, an element or operation recited in the singular and proceeded with the word "a" or "an" should be understood as not excluding plural elements or operations, unless such exclusion is explicitly recited. Furthermore, references to "exemplary embodiment," "one embodiment," or "some embodiment" of the present disclosure are not intended to be interpreted as excluding the existence of additional embodiments that also incorporate the recited features.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The patent claims at the end of this document are not intended to be construed under 35 U.S.C. § 112(f) unless traditional means-plus-function language is expressly recited, such as "means for" or "step for" language being expressly recited in the claim(s).

Although the Figures show a specific order of method operations, actions, or functionality, the order of such may differ from what is depicted. Also, two or more operations, actions, or functionalities may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection operations or actions, processing operations or actions, comparison operations or actions, and decision operations or actions.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The term "coupled" and variations thereof, as used herein, means the joining of two members directly or indirectly to one another. Such joining may be stationary (e.g., permanent, or fixed) or moveable (e.g., removable, or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

In various implementations, the functionality and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular industrial environment or portion of an industrial environment. Additionally or alternatively, the operations may be performed by a combination of one or more central or offsite computing devices/servers and one or more local controllers/computing devices. All such implementations are contemplated within the scope of the present disclosure.

Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A vehicle reporting system for generating vehicle indicators based upon vehicle usage information, the vehicle reporting system comprising:

one or more memory devices having instructions stored thereon that, when executed by one or more processors, cause the one or more processors to perform operations comprising:

receiving vehicle usage information associated with a vehicle;

generating a first vehicle indicator for the vehicle based upon the vehicle usage information, the first vehicle indicator including a first quantitative indication regarding how the vehicle was driven during a first period of time with respect to a first driving characteristic;

generating a second vehicle indicator for the vehicle based upon the vehicle usage information, the second vehicle indicator including a second quantitative indication regarding how the vehicle was driven during a second period of time with respect to a second driving characteristic, the second driving characteristic being different than the first driving characteristic;

performing an action using the first vehicle indicator and the second vehicle indicator; and generating, using the one or more processors, a vehicle recommendation based upon the vehicle usage information, the vehicle recommendation including at least one of a recommended driving habit change or a recommended maintenance action and an indication of an effect that the recommended driving habit change or the recommended maintenance action will have on a value of the vehicle, wherein the vehicle recommendation is further based upon vehicle location information and actions taken by other drivers within a predetermined geographical proximity to the vehicle.

2. The vehicle reporting system of claim 1, wherein at least one of the first driving characteristic or the second driving characteristic includes an acceleration of the vehicle, a braking of the vehicle, or a speed of the vehicle.

3. The vehicle reporting system of claim 2, wherein the vehicle usage information includes vehicle telematics information captured while the vehicle was driven via at least one of a sensor of the vehicle or a driving monitoring sensor installed within the vehicle, and at least one of the first vehicle indicator or the second vehicle indicator corresponding to the at least one of the first driving characteristic or the second driving characteristic is generated based upon the vehicle telematics information.

4. The vehicle reporting system of claim 1, wherein performing the action comprises:

generating a user interface including the first vehicle indicator and the second vehicle indicator; and causing the user interface to be displayed on a computing device of a user.

5. The vehicle reporting system of claim 4, wherein at least one of the first quantitative indication or the second quantitative indication is provided on a scale with a textual indication of a relative qualitative value of the at least one of the first quantitative indication or the second quantitative indication.

6. The vehicle reporting system of claim 4, wherein at least one of the first vehicle indicator or the second vehicle indicator includes an indication of periods of non-use of the vehicle.

7. The vehicle reporting system of claim 4, wherein the user interface further includes the vehicle recommendation.

8. The vehicle reporting system of claim 4, wherein the operations further comprise:

determining that the vehicle usage information meets a pre-determined goal criteria for at least one driving characteristic; and generating a badge corresponding to the at least one driving characteristic based upon the vehicle usage information meeting the pre-determined goal criteria for the at least one driving characteristic, wherein the user interface further includes the badge.

9. The vehicle reporting system of claim 4 wherein at least one of the first vehicle indicator or the second vehicle indicator includes a relative amount of distance of highway driving and city driving performed by the vehicle.

10. The vehicle reporting system of claim 9, wherein the relative amount of distance of highway driving and city driving is determined based upon at least one of speed information of the vehicle or geolocation information of the vehicle, the at least one of the speed information or the geolocation information being captured by one or more sensors of the vehicle.

11. The vehicle reporting system of claim 1, wherein the first period of time and the second period of time are the same period of time.

12. A computer-implemented method for providing a vehicle report based on vehicle telematics information associated with a vehicle, the computer-implemented method comprising:

receiving, using one or more processors and one or more computer-readable storage media having instructions stored thereon executable by the one or more processors, vehicle telematics information associated with a vehicle, the vehicle telematics information captured while the vehicle was driven via at least one of a sensor of the vehicle or a driving monitoring sensor installed within the vehicle;

generating, using the one or more processors, a plurality of vehicle indicators for the vehicle based upon the vehicle telematics information, each of the plurality of vehicle indicators providing information regarding how the vehicle was driven during a period of time with respect to a different driving characteristic;

performing, using the one or more processors, an action using the plurality of vehicle indicators; and generating, using the one or more processors, a vehicle recommendation based upon the vehicle telematics information, the vehicle recommendation including at least one of a recommended driving habit change or a recommended maintenance action and an indication of an effect that the recommended driving habit change or the recommended maintenance action will have on a value of the vehicle, wherein the vehicle recommendation is further based upon vehicle location information and actions taken by other drivers within a predetermined geographical proximity to the vehicle.

13. The computer-implemented method of claim 12, wherein at least one of the plurality of vehicle indicators relates to an acceleration of the vehicle, a braking of the vehicle, a speed of the vehicle, a relative amount of distance of highway driving and city driving performed by the vehicle, or one or more periods of non-use of the vehicle.

14. The computer-implemented method of claim 12, wherein performing the action comprises:

generating, using the one or more processors, a user interface including the plurality of vehicle indicators; and causing, using the one or more processors, the user interface to be displayed on a computing device of a user.

15. A non-transitory computer-readable medium comprising instructions stored thereon that, when executed by one or more processors, cause the one or more processors to perform operations comprising:

receiving vehicle usage information associated with a vehicle;

generating a vehicle indicator for the vehicle based upon the vehicle usage information, the vehicle indicator including an indication regarding how the vehicle was driven during a period of time with respect to a driving characteristic;

generating a vehicle recommendation based upon the vehicle usage information, vehicle location information, and actions taken by other drivers within a predetermined geographical proximity to the vehicle, the vehicle recommendation including at least one of a recommended driving habit change or a recommended maintenance action and an indication of an effect that the recommended driving habit change or the recommended maintenance action will have on a value of the vehicle;

generating a user interface including the vehicle indicator and the vehicle recommendation; and causing the user interface to be displayed on a computing device of a user.

16. The non-transitory computer-readable medium of claim 15, wherein the vehicle indicator relates to an acceleration of the vehicle, a braking of the vehicle, a speed of the vehicle, a relative amount of distance of highway driving and city driving performed by the vehicle, or one or more periods of non-use of the vehicle.

* * * * *